US007717468B2

(12) United States Patent
Isaacs

(10) Patent No.: US 7,717,468 B2

(45) Date of Patent: May 18, 2010

(54) CLIPBOARD WITH AN INTEGRAL THREE DIMENSIONAL DISPLAY

(75) Inventor: Judah Isaacs, Lawrence, NY (US)

(73) Assignee: Innovative Premiums Inc., Oceanside, NY (US)

( * ) Notice: Subject to any disclaimer, the term of this patent is extended or adjusted under 35 U.S.C. 154(b) by 379 days.

(21) Appl. No.: 11/606,578

(22) Filed: Nov. 30, 2006

(65) Prior Publication Data

US 2007/0126224 A1 Jun. 7, 2007

Related U.S. Application Data

(60) Provisional application No. 60/741,107, filed on Dec. 1, 2005.

(51) Int. Cl.

| | |
|---|---|
| ***B42D 3/00*** | (2006.01) |
| ***B42D 17/00*** | (2006.01) |
| ***B42D 7/00*** | (2006.01) |
| ***B42D 3/18*** | (2006.01) |
| ***G09B 23/28*** | (2006.01) |

(52) U.S. Cl. ............................ 281/45; 281/44; 281/49; 281/51; 24/67.11; 434/267; 434/272

(58) Field of Classification Search ................ 24/67.11, 24/312; 33/1 B, 1 N; 128/898; 206/224, 206/309, 310, 311; 273/109, 113, 447, 448, 273/DIG. 24; 281/29, 31, 37, 45, 51; 402/4, 402/8 R, 79; 434/267, 272, 273, 408, 413, 434/416, 422, 423, 425, 427; 606/170, 174, 606/205, 206, 210; D6/419, 420; *A63F 03/00, A63F 03/04, 09/00; B42F 13/00, 13/40; B43L 01/00, B43L 03/00; G01B 03/02, 03/56*

See application file for complete search history.

(56) References Cited

U.S. PATENT DOCUMENTS

| | | | | |
|---|---|---|---|---|
| 1,951,422 A | | 3/1934 | Klemperer | |
| D106,450 S | | 10/1937 | Matheson | |
| D158,662 S | | 5/1950 | Hendrickson | |
| D159,446 S | | 7/1950 | Riley | |
| 3,440,750 A | | 4/1969 | Toth et al. | |
| 4,057,902 A | * | 11/1977 | Matsui | 33/1 N |
| 4,226,902 A | | 10/1980 | Webb | |
| 4,323,350 A | | 4/1982 | Bowden, Jr. | |
| 4,422,852 A | | 12/1983 | Mathias | |
| 4,624,642 A | | 11/1986 | Ferrara | |
| 4,702,701 A | | 10/1987 | Glover et al. | |
| 4,802,858 A | | 2/1989 | Lindskog et al. | |
| 4,819,963 A | | 4/1989 | Wolski | |
| 4,841,651 A | | 6/1989 | Conner | |
| 4,869,531 A | | 9/1989 | Rees | |
| 4,941,276 A | | 7/1990 | Kanner | |
| 4,951,404 A | | 8/1990 | Lithwick | |
| 5,009,626 A | | 4/1991 | Katz | |
| 5,046,760 A | * | 9/1991 | Krepp | 281/45 |
| 5,112,228 A | | 5/1992 | Zouras | |
| 5,196,242 A | | 3/1993 | Vicino | |
| 5,244,394 A | | 9/1993 | Serabian-Musto | |
| 5,295,694 A | * | 3/1994 | Levin | 273/447 |
| 5,375,883 A | * | 12/1994 | Wyant | 281/37 |
| D359,255 S | | 6/1995 | Williams | |
| 5,505,623 A | | 4/1996 | Chernack et al. | |
| 5,518,407 A | | 5/1996 | Greenfield et al. | |

(Continued)

*Primary Examiner*—Dana Ross
*Assistant Examiner*—Justin V Lewis
(74) *Attorney, Agent, or Firm*—Katten Muchin Roseman LLP

(57) ABSTRACT

A clipboard including a board having first and second surfaces, a clip integral with the first surface, and a plurality of recesses formed in the second surface, the recesses are adapted to receive one or more models.

19 Claims, 14 Drawing Sheets

U.S. PATENT DOCUMENTS

| | | | | |
|---|---|---|---|---|
| 5,607,311 | A | | 3/1997 | Browne-Wilkinson |
| 5,636,873 | A | | 6/1997 | Sonsteby |
| 5,657,562 | A | | 8/1997 | Desormeaux |
| 5,672,059 | A | | 9/1997 | Browne-Wilkinson |
| 5,720,502 | A | | 2/1998 | Cain |
| D394,672 | S | | 5/1998 | Allen et al. |
| 5,887,906 | A | | 3/1999 | Sultan |
| 5,915,729 | A | | 6/1999 | Vap |
| 5,951,301 | A | | 9/1999 | Younker |
| 5,997,307 | A | | 12/1999 | LeJeune, Jr. |
| 6,023,872 | A | | 2/2000 | Falkenstein, Sr. |
| D422,315 | S | | 4/2000 | Bosack |
| 6,113,395 | A | | 9/2000 | Hon |
| 6,132,218 | A | | 10/2000 | Benja-Athon |
| D434,997 | S | | 12/2000 | Wright et al. |
| 6,224,106 | B1 | | 5/2001 | Murphy |
| D450,763 | S | | 11/2001 | Fernandes et al. |
| 6,336,812 | B1 | | 1/2002 | Cooper et al. |
| 6,383,135 | B1 | | 5/2002 | Chikovani et al. |
| 6,517,407 | B1 | | 2/2003 | Peters |
| 6,575,803 | B1 | | 6/2003 | Liu |
| 6,638,073 | B1 | | 10/2003 | Kazimirov et al. |
| 6,866,516 | B2 | * | 3/2005 | Smith et al. ................. 434/408 |
| 6,908,309 | B2 | | 6/2005 | Gil et al. |
| 2002/0043764 | A1 | | 4/2002 | Imhof |
| 2005/0202381 | A1 | | 9/2005 | Keegan |

* cited by examiner

CLIPBOARD WITH AN INTEGRAL THREE DIMENSIONAL DISPLAY

CROSS-REFERENCE TO RELATED APPLICATION

This application claims priority from U.S. Provisional Application 60/741,107, filed Dec. 1, 2005, the contents of which are hereby incorporated by reference.

BACKGROUND OF THE INVENTION

1. Field of the Invention

The invention relates generally to clipboards for holding papers and providing a writing surface and, more particularly, to a clipboard including an integral three dimension display.

2. Discussion of the Prior Art

Clipboards, which provide a portable, solid flat surface suitable for writing or drawing and which incorporate a clip device to secure one or more pieces of paper to the flat surface, have been known for many years. Many attempts have been made to expand the basic function of the clipboard to include such features as a storage drawer which slides out from the bottom area of the clipboard in which can be stored pencils, erasers and any small drawing or writing aids desired.

Another advancement of the functionality of the clipboard is found in a design that incorporates slotted compartments machined into the lateral edges of the hard surface of the clipboard to accommodate drafting aids such as triangles, templates and squares. A clipboard tailored to police enforcement use which is transparent and bullet proof so that it may be held in front of the police officer as a protecting shield while, as an example, a ticket is being written is known. Still other designs further encompasses a handle cut into one side of the hard surface so that the clipboard can be more easily held securely. Other clipboard designs incorporate lamp assemblies, digital clocks, folding covers, and/or other storage areas.

However, prior art clipboards do not address the needs of persons who both require the basic functions of a clipboard and also use models or other three dimensional displays in conjunction with a clipboard. In other words, users of prior art clipboards, such as, for example, doctors on rounds interacting with patients, that may need to explain complex relationships or physical arrangements using a model or other display, must carry the model in addition to their clipboard.

Accordingly, a need exists for an improved clipboard and an improved means for transporting and displaying a three dimensional model.

SUMMARY OF THE INVENTION

In accordance with the invention, a clipboard with an integral three dimensional display provides a convenient means for both supplying a stable writing surface and a display frame for three dimensional representations of any type. In some embodiments, the rear surface of the clipboard may include one or more recessed portions adapted to house three dimensional models, e.g., raised relief models, attached to, or formed in the material of, the clipboard.

In some embodiments, the three dimensional models may include models that do not extend out beyond the rear surface of the clipboard so that the clipboard may lay flat on a flat surface.

In other embodiments, the three dimensional models may extend beyond the rear surface of the clipboard. In such embodiments, the models may be shaped and/or disposed so as to allow the clipboard to remain stable when placed on a flat surface such as a table.

In some embodiments, the invention may include an erasable marker, e.g., a dry erase marker, and the three dimensional models may be adapted to be marked by the user to explain, illustrate and/or highlight aspects of the models. The above and other features of the invention will become more readily apparent from the following detailed description accompanied by the following drawings.

DETAILED DESCRIPTION OF THE INVENTION

Figure 1:
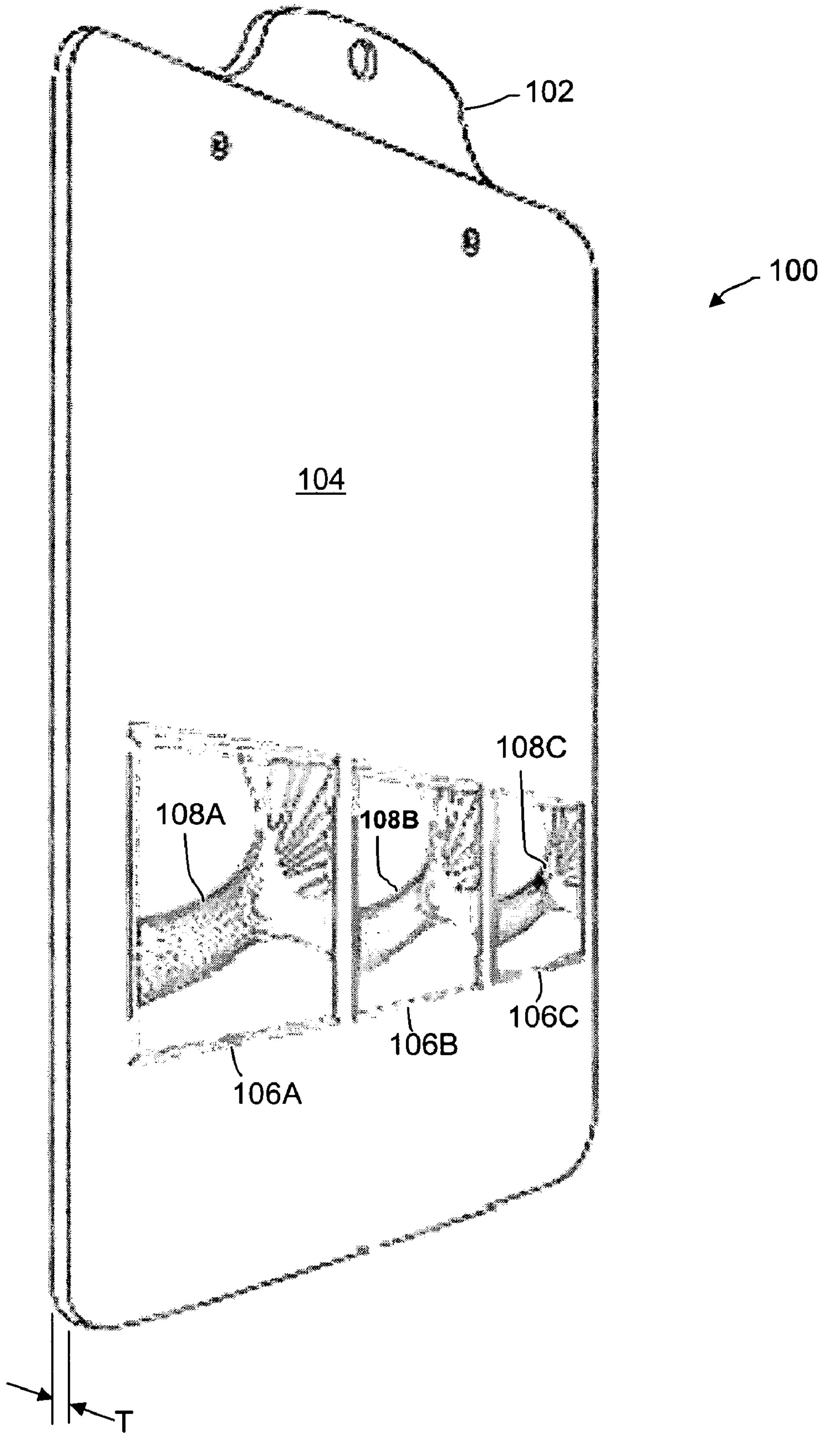
FIG. 1 is a drawing illustrating a perspective view of an example clipboard with an integral three dimensional display according to embodiments of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, back, and front may be used with respect to the drawings. These and similar directional terms should not be construed to limit the scope of the invention in any manner. The words "connect," "couple," "attach," "join," and similar terms with their inflectional morphemes do not necessarily denote direct and immediate connections, but also include connections through mediate elements or devices.

Turning to FIG. 1, a perspective view of the rear of an example clipboard with an integral three dimensional display 100 is depicted. The inventive clipboard 100 may include a clip 102 for securing papers (and/or other items) to the front writing surface (not visible in FIG. 1). The rear surface 104 of the clipboard 100 may include one or more recesses 106A, 106B, 106C. Disposed within the one or more recesses 106A, 106B, 106C, one or more three dimensional models 108A, 108B, 108C may be joined to the clipboard 100. The clipboard 100 has a thickness with a dimension labeled T. The thickness T may be of any practicable size that is sufficient to both provide a substantially rigid, stable writing surface and, at the same time, to provide for the one or more recesses 106A, 106B, 106C to be deep enough to contain the one or more three dimensional models 108A, 108B, 108C.

The clipboard 100 as shown in FIG. 1 may be used as a demonstration model as well as for a clipboard function. The clipboard 100 may include three dimensional representations 108A, 108B, 108C of any type that are mounted or coupled to the rear surface 104 within the one or more recesses 106A, 106B, 106C (e.g., panel areas that are partially indented). The crafting of the three dimensional representations 108A, 108B, 108C separately from the clipboard 100 may allow for a greater detail, different workmanship, and/or different materials to be used than for the clipboard per se. The three dimensional relief effect may be designed so as not to cause the clipboard to be unstable on a flat surface as will be described in more detail below.

Figure 2:
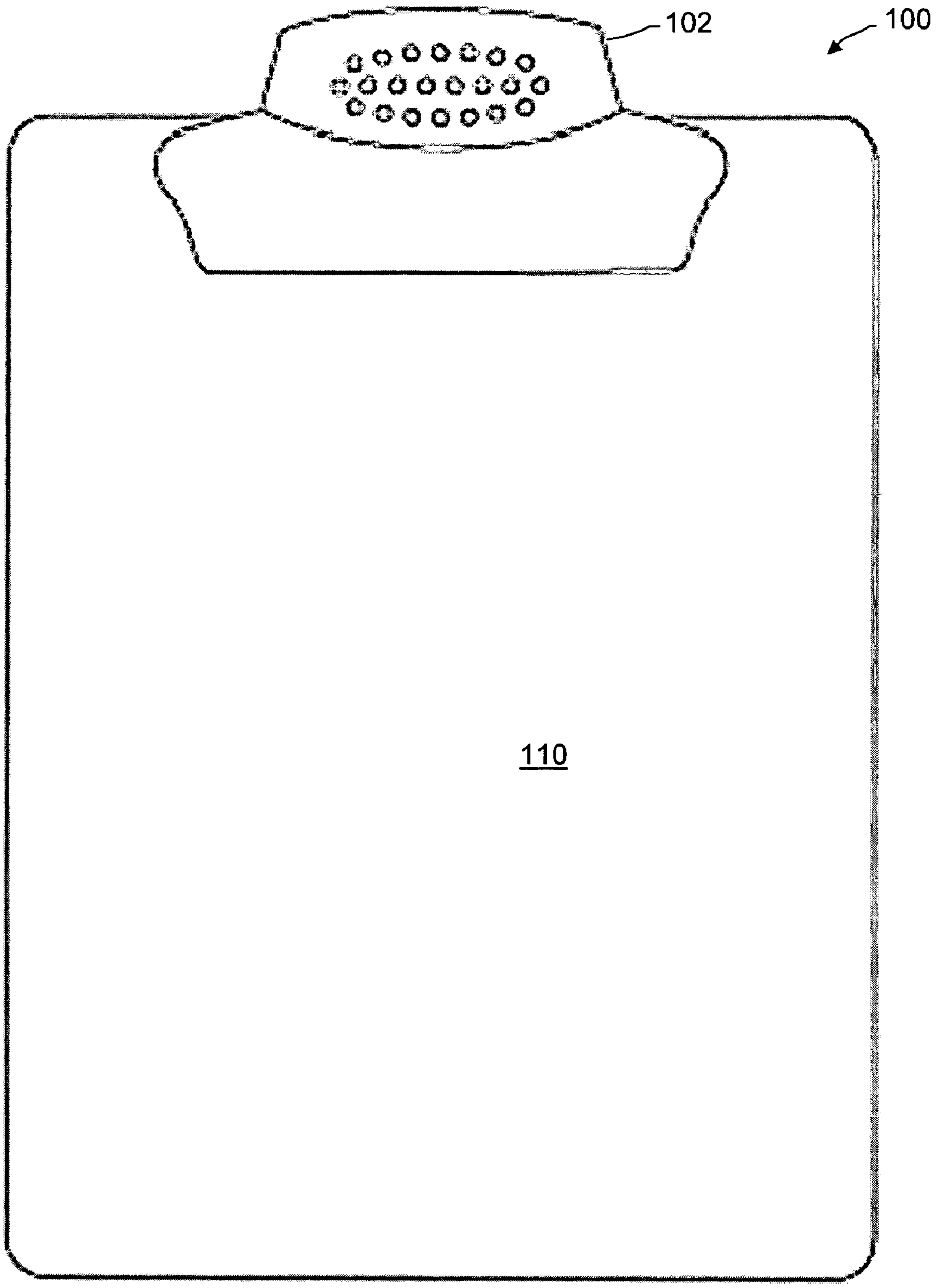
FIG. 2 is a drawing illustrating a front plan view of an example clipboard with an integral three dimensional display according to embodiments of the present invention.

Turning now to FIGS. 2 though 5, front, rear, side, and top views, respectively, of an example embodiment of the inventive clipboard with an integral three dimensional display 100, are depicted. The particular example depicted in the FIGS. illustrates three small, square-shaped recesses 106A, 106B, 106C disposed in a line on the lower rear surface 104 of the clipboard 100. However, any number, size, and/or shape recesses may be used that are practicable and they may be positioned in any location on the front or back of the clipboard 100. For example, a single oval shaped recess that covers almost the entire rear surface 104 may be used to allow one or more large three-dimensional models to be used.

Figure 3:
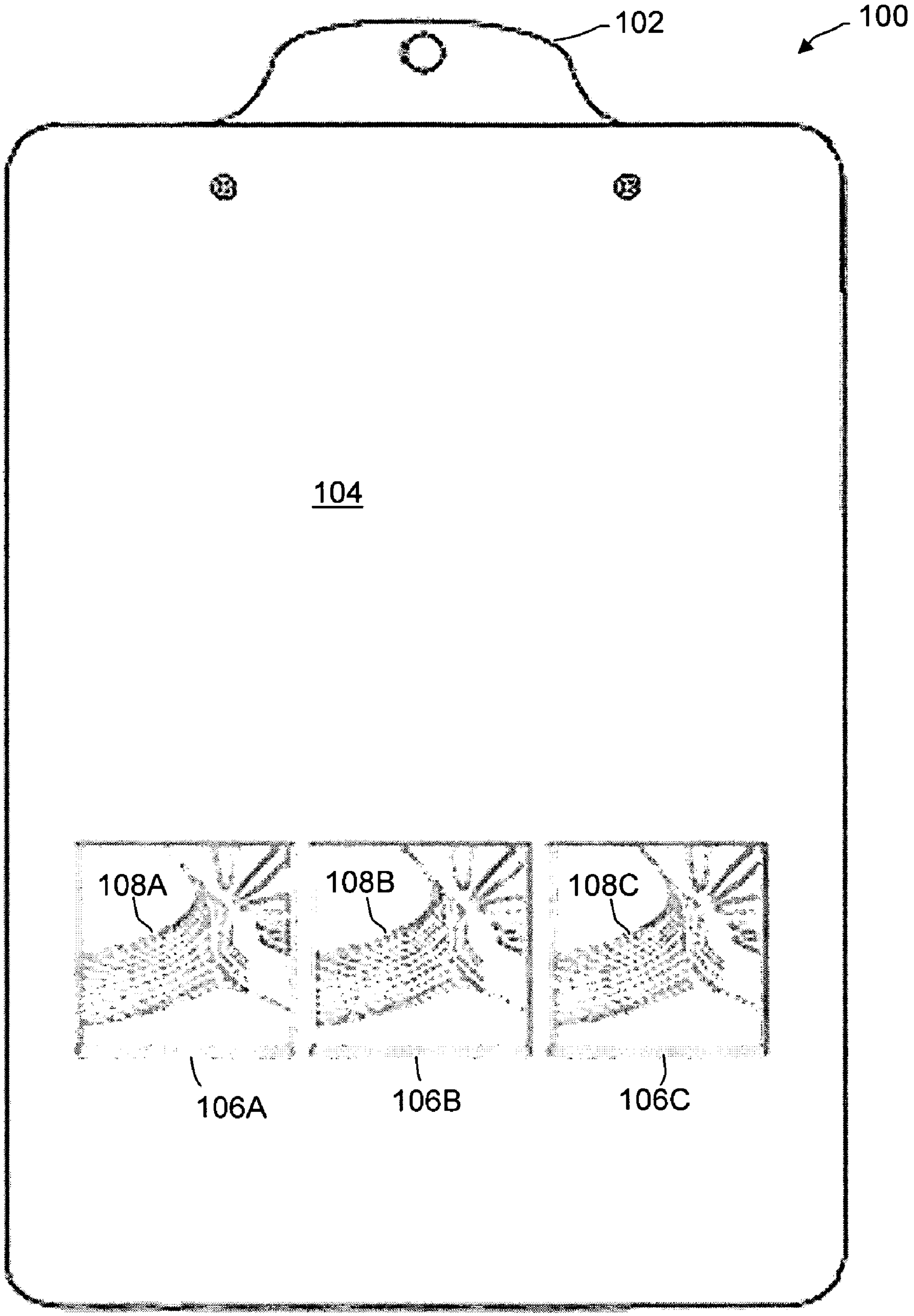
FIG. 3 is a drawing illustrating a rear plan view of an example clipboard with an integral three dimensional display according to embodiments of the present invention.
Figure 6:
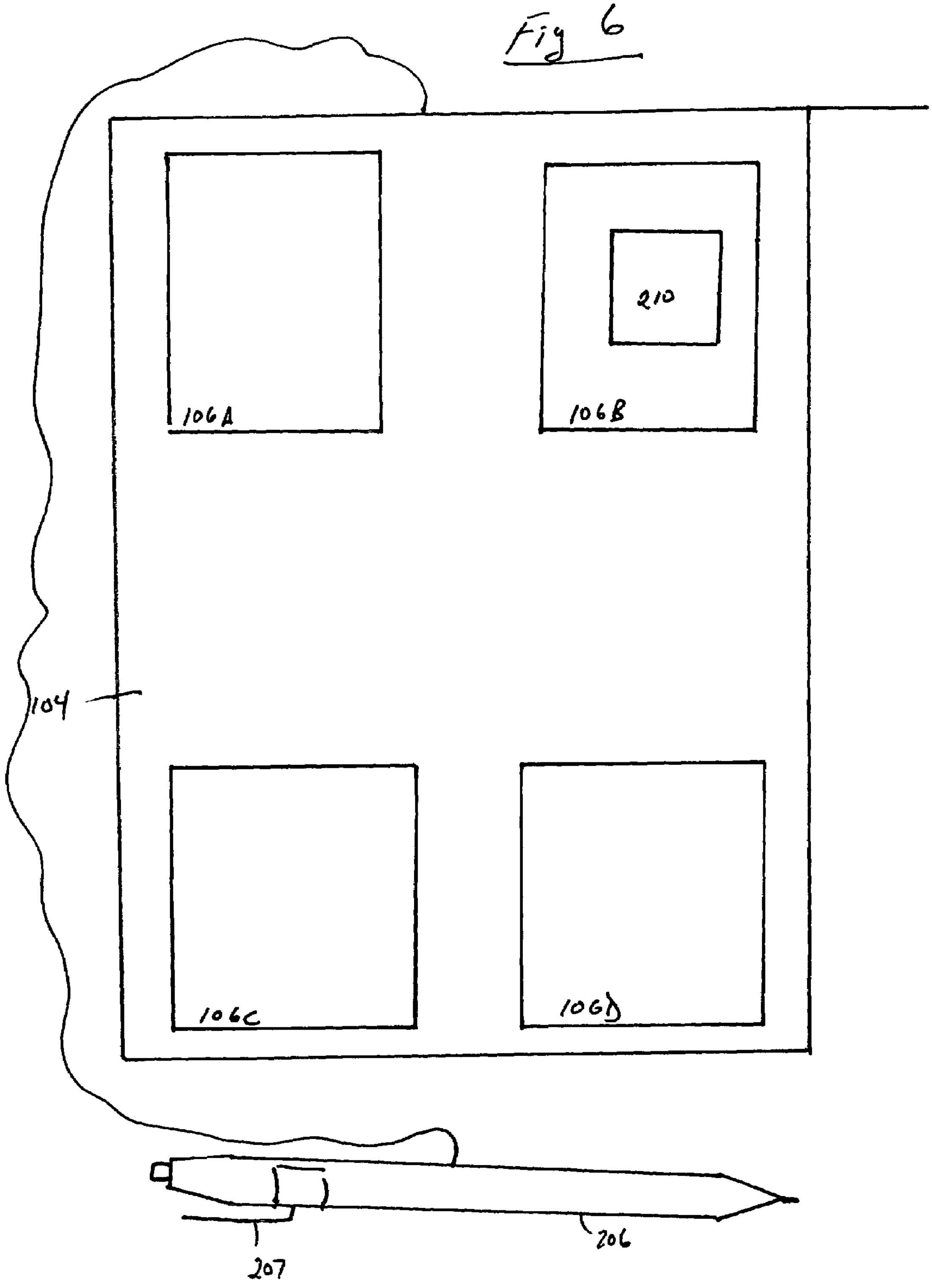
FIG. 6 is a drawing illustrating a rear plan view of an example clipboard with an integral three dimensional display according to embodiments of the present invention.
Figure 7A:
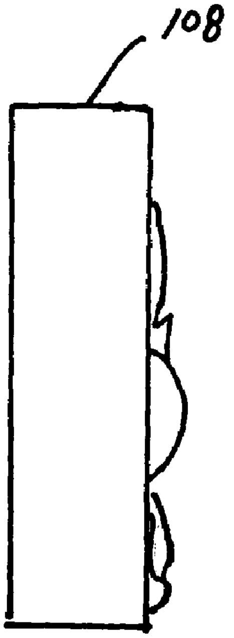
FIGS. 7A and 7B are drawings illustrating side and perspective views of a model according to embodiments of the present invention.
Figure 7B:
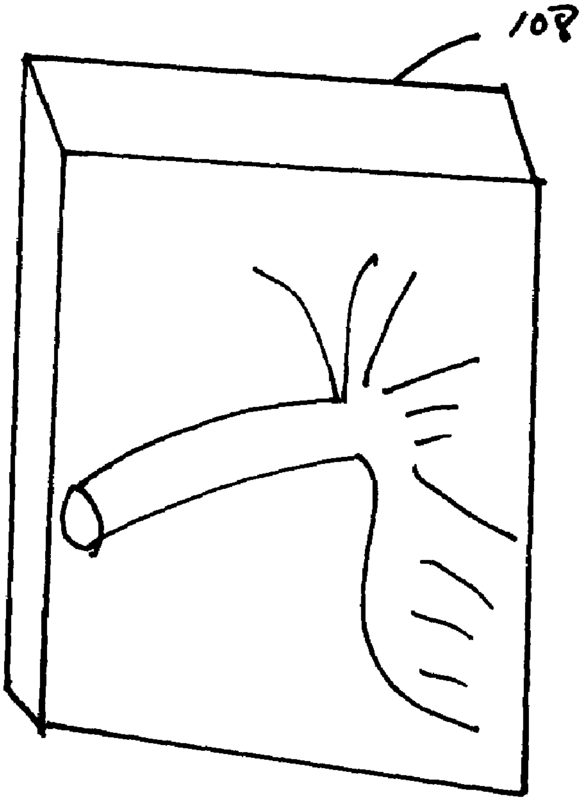
Figure 8:
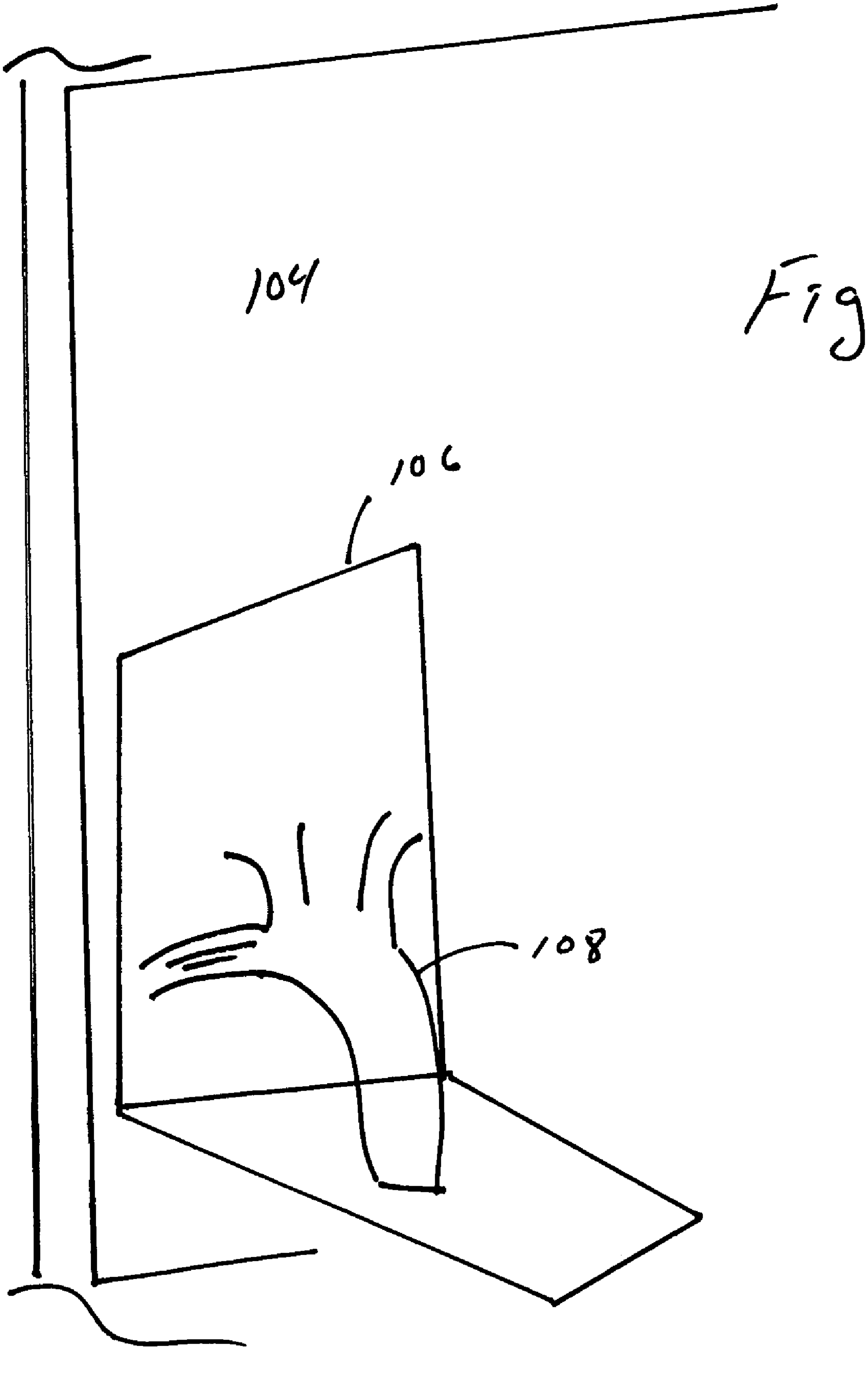
FIG. 8 is a drawing illustrating a rear perspective view of an example clipboard with a fold out three dimensional display according to embodiments of the present invention.
Figure 9:
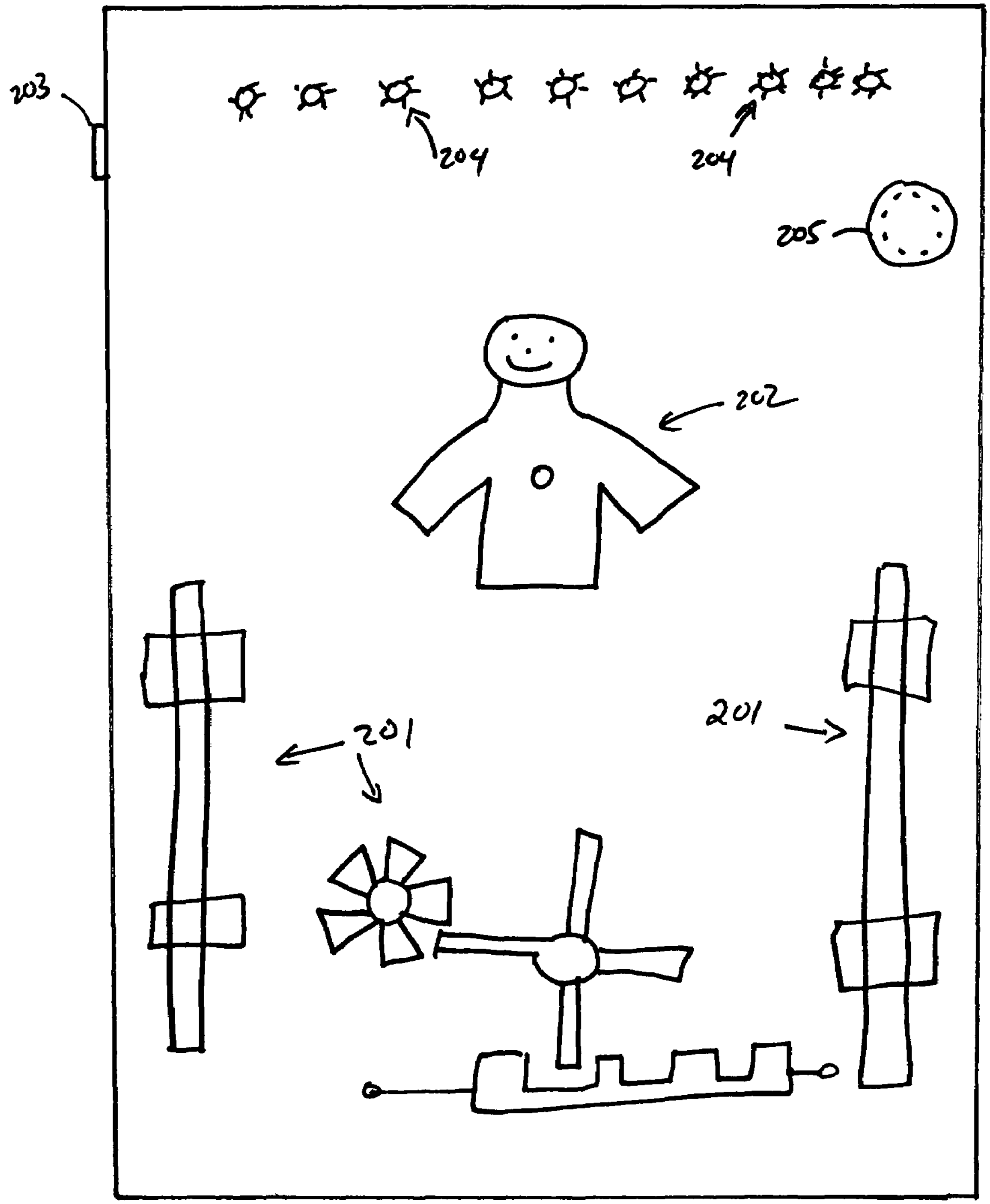
FIG. 9 is a drawing illustrating a rear plan view of an example clipboard with an integral three dimensional display according to embodiments of the present invention.

The particular example three dimensional models illustrated in the FIGS. are of a portion of a human stomach. Such models may be useful, e.g., for a doctor working in a hospital. For example, an internist may use the clipboard on rounds. Holding a patient chart on the front, an erasable pen as shown in FIG. 6 and the three dimensional models 108A, 108B, 108C on the back may be used to explain the patient's medical conditions and possible treatments. After the consultation, the physician can simply wipe the markings off the three dimensional models 108A, 108B, 108C and proceed to the next patient. Although relief models are depicted in the FIGS., any type of models may be employed. For example, models that may be extended out of the recesses 106A, 106B, 106C as shown in FIGS. 7A and 7B may be used. Alternatively, fold out models may be used, as shown in FIG. 8. As shown in FIG. 9, in some embodiments, models that include moving (e.g., rotating, sliding, etc.) parts 201 and/or removable parts 202 may be used. For example, powered models that include, activation/control switches 203, lights (e.g., LEDs) 204, electric motors (not shown), and/or sound generators may be employed. As shown in FIG. 9 is an example of a clipboard for entertaining a child patient to put them at ease while they are being examined. Alternative embodiments include demonstrations of the physiological workings of portions of the body, for example the stomach as shown in FIG. 3.

Figure 4:
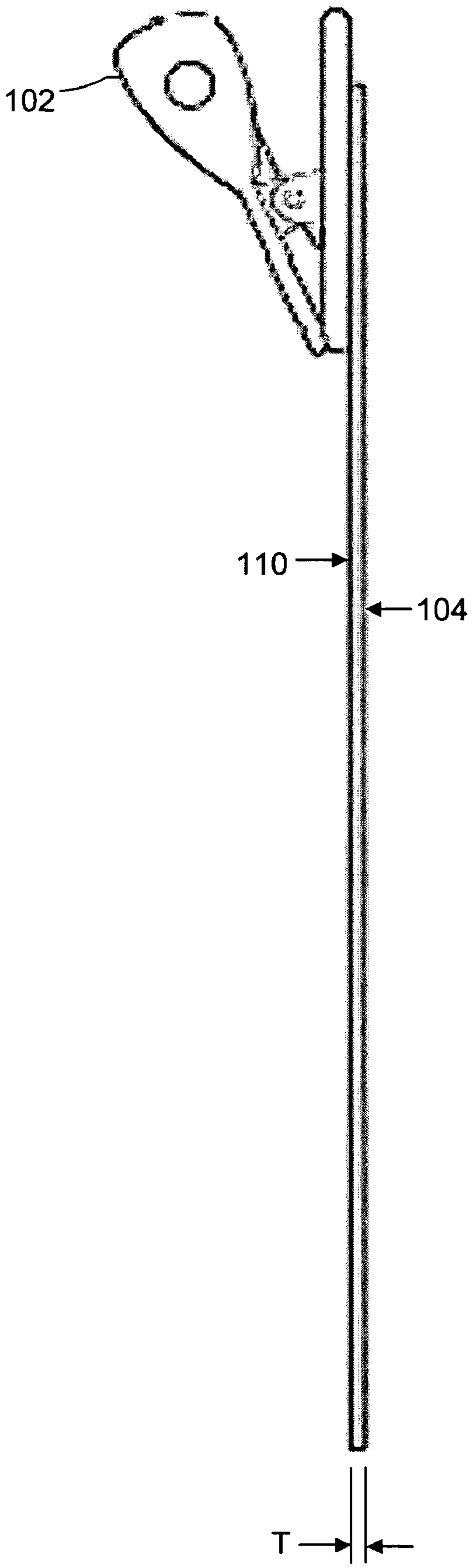
FIG. 4 is a drawing illustrating a side plan view of an example clipboard with an integral three dimensional display according to embodiments of the present invention.
Figure 5:
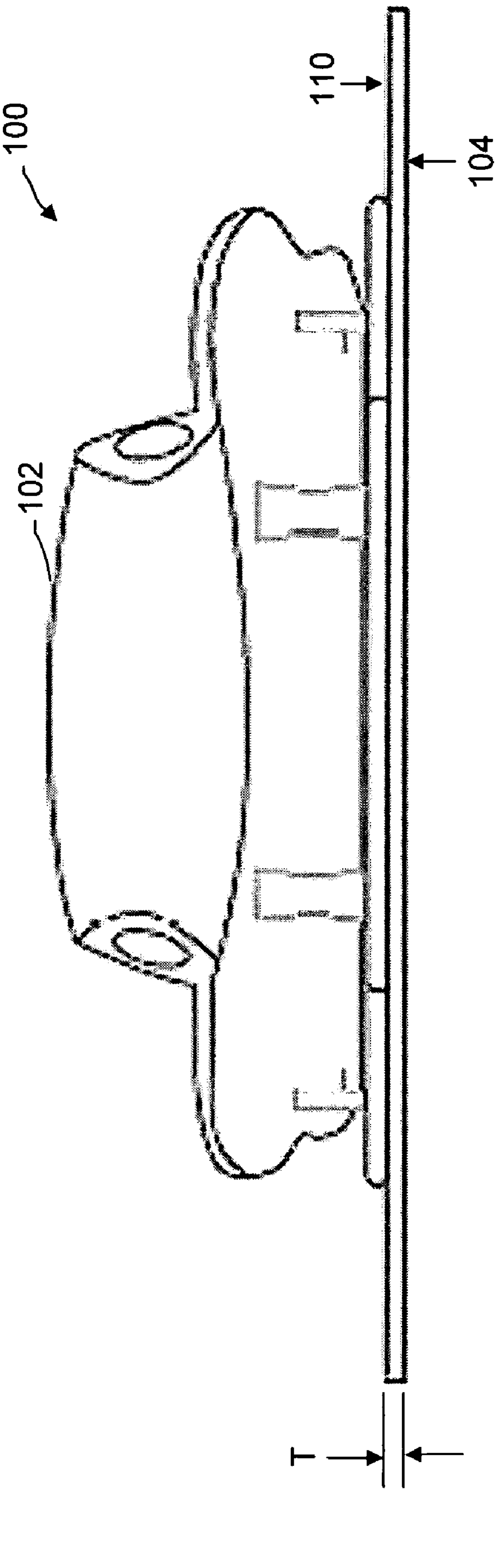
FIG. 5 is a drawing illustrating a top plan view of an example clipboard with an integral three dimensional display according to embodiments of the present invention.
Figure 10:
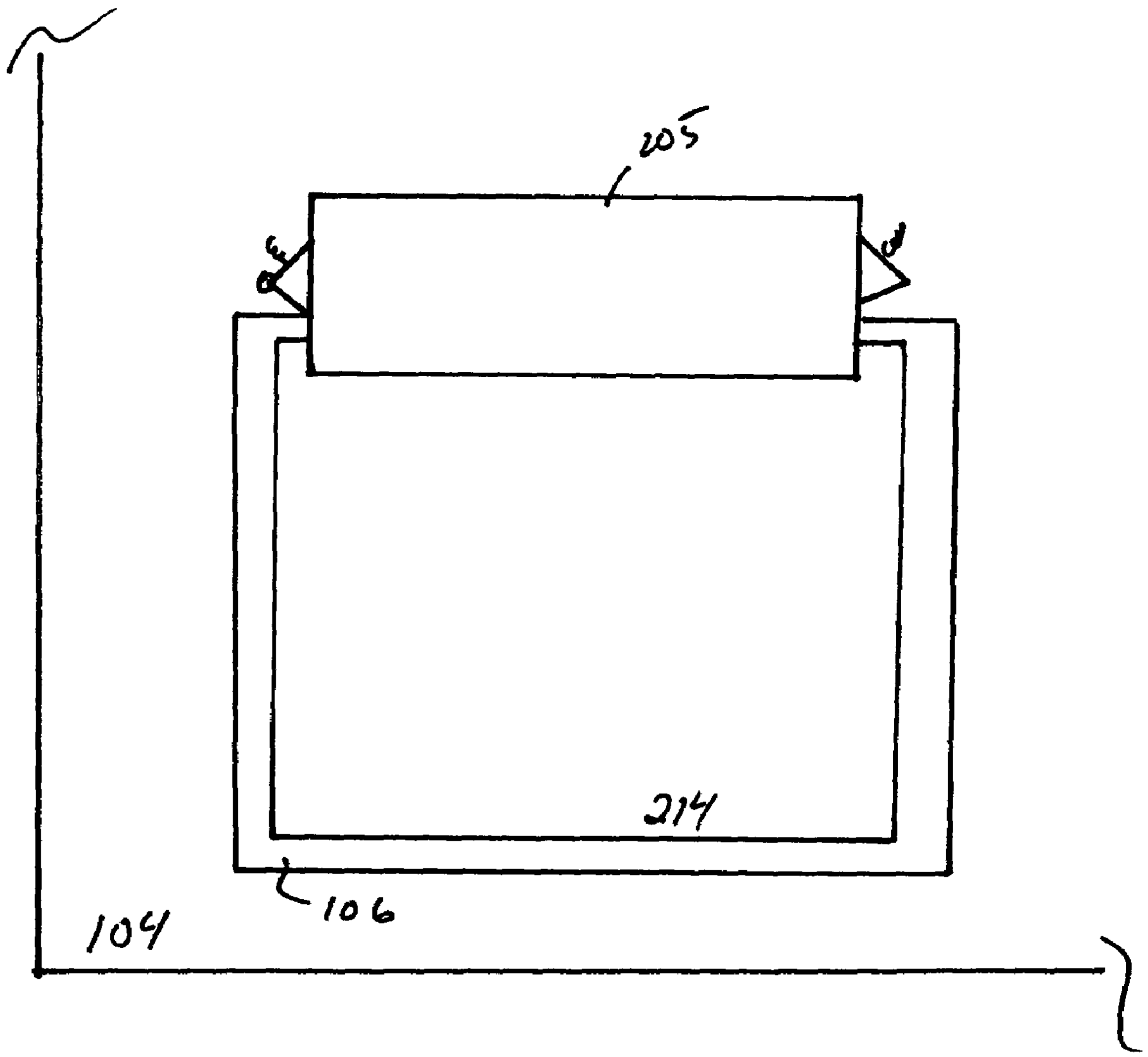
FIG. 10 is a drawing illustrating a rear plan view of a portion of a clipboard with a clip according to embodiments of the present invention.
Figure 14:
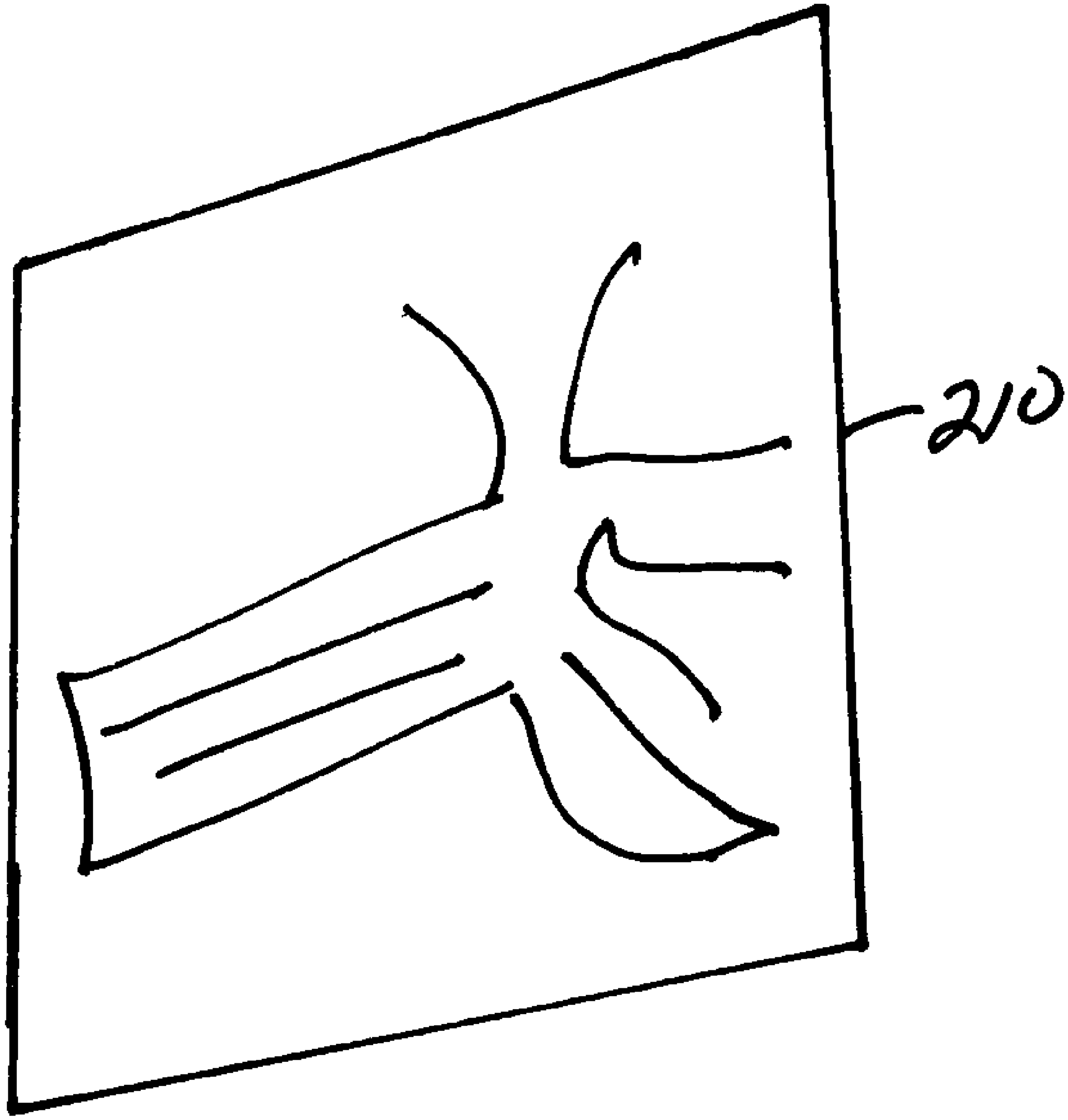
FIG. 14 is a drawing illustrating a perspective view of a thin film for use with a model according to embodiments of the present invention.

As can be more clearly seen in FIGS. 2, 4, and 5, the example clipboard 100 may include a conventional clip 102 for holding papers etc., but may also include multiple and/or different types of clips disposed in different locations on the front surface 110 and/or on the rear surface 104. For example, a clip 205 as shown in FIG. 10 may be disposed within or above the one or more recesses 106A, 106B, 106C to secure a removable, contoured or flat transparent film 214 on the one or more three dimensional models 108A, 108B, 108C. Such a film 214 is shown in FIG. 14. In some embodiments, the contoured transparent film 214 may be adapted to be marked-up by the user of the clipboard 100, e.g., for illustrative purposes and given out to the person to whom the three dimensional models 108A, 108B, 108C were displayed.

Figure 11:
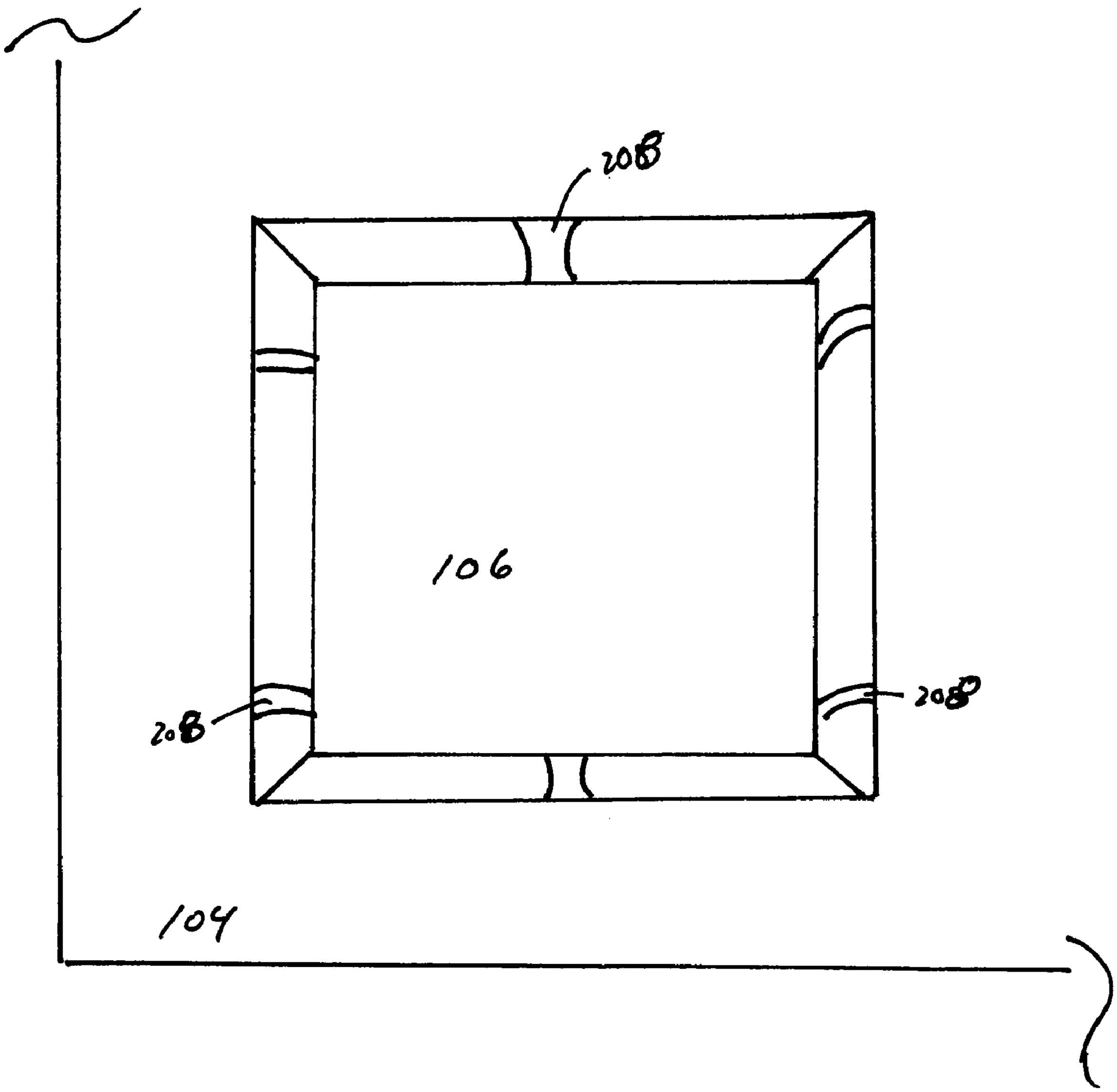
FIG. 11 is a drawing illustrating a rear plan view of a portion of a clipboard with recessed clips according to embodiments of the present invention.
Figure 12:
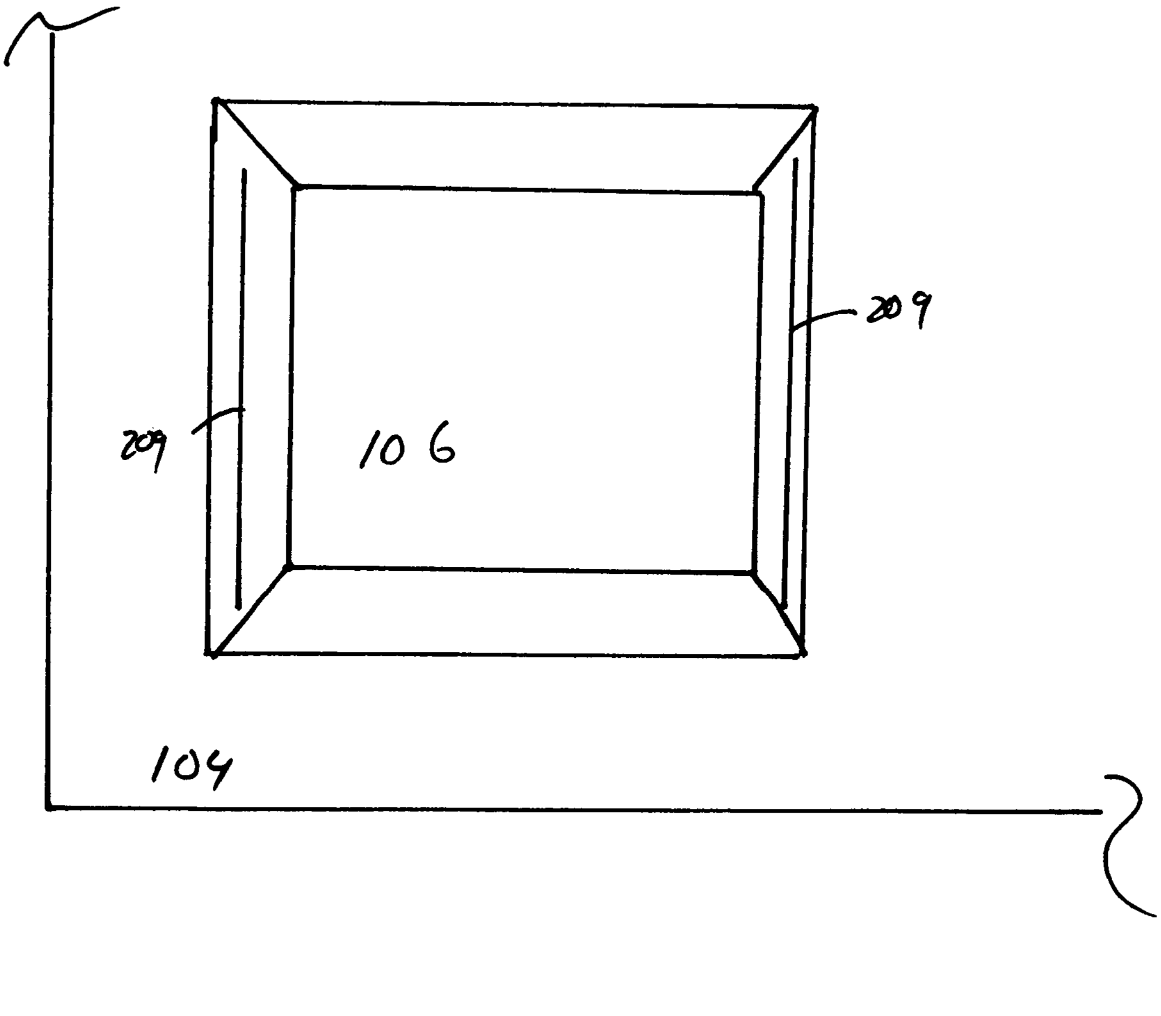
FIG. 12 is a drawing illustrating a rear plan view of a portion of a clipboard with a retaining ridge according to embodiments of the present invention.

In some embodiments, the three dimensional models 108A, 108B, 108C themselves may be removable and/or adapted to be marked. The present invention may include a combination pen 206 as shown in FIG. 6 (e.g., that uses conventional ink) and marker (e.g., a dry erase marker) that is suitable for both writing on paper on the front surface 100 with the pen and for erasably marking the three dimensional models 108A, 108B, 108C on the back with the marker. The combination pen and marker 206 may further include a tool 207 adapted to aid in the removal and replacement of the three-dimensional models 108A, 108B, 108C. The three dimensional models 108A, 108B, 108C may be made of a relatively inexpensive material, e.g. plastic, rubber, etc., to allow the user of the clipboard 100 to give away the models. In some embodiments, the user may have a plurality of different three-dimensional models that may be inserted into the one or more recesses 106A, 106B, 106C to illustrate different concepts or physical structures as shown in FIG. 1. As shown in FIG. 11, one aspect of the clipboard may be a recessed clip 208 that may be used to secure the models 108A, 108B, 108C within the one or more recesses 106A, 106B, 106C. In other embodiments, the models 108A, 108B, 108C may be friction fitted or snapped into the recesses 106A, 106B, 106C using a retaining ridge or lip 209 as shown in FIG. 12. In some embodiments, the models 108A, 108B, 108C may be permanently affixed to the clipboard 100 and/or molded, milled, or shaped from the same piece of material used to for the clipboard 100. The models 108A, 108B, 108C and the clipboard may be made from any material or materials that is/are practicable.

Figure 13:
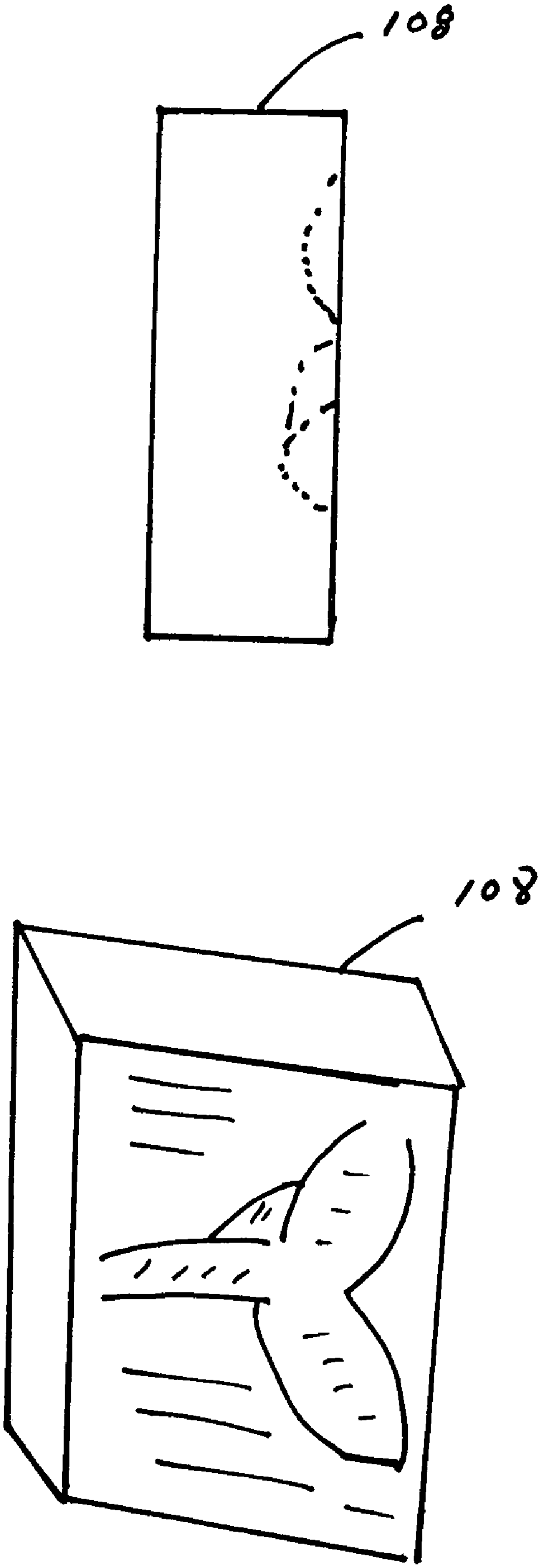
FIG. 13 are drawings illustrating side and perspective views of a model according to embodiments of the present invention.

In some embodiments as pictured in the FIGS., the models 108A, 108B, 108C maybe dimensioned so as not to extend out beyond the rear surface 104 of the clipboard 100 so that the clipboard 100 may lay flat on a flat surface. FIGS. 13A and 13B show a model 108 which has a contoured shape which does not project beyond the surface 104 of the clipboard when inserted into recesses 106. In other embodiments, the three dimensional models 108A, 108B, 108C may protrude out beyond the rear surface 104 of the clipboard 100, as shown in FIGS. 7A and 7B. In such embodiments, the models 108A, 108B, 108C may be shaped and/or disposed so as to allow the clipboard 100 to remain stable when placed on a flat surface such as a table. Alternatively or additionally, the recesses 106A, 106B, 106C may be located to insure the clipboard 100 to remains stable when placed on a flat surface. For example, a recess may be disposed in each of the four corners of the clipboard 100, as shown in FIG. 6.

In some embodiments, instead of (or in addition to) recesses 106A, 106B, 106C, as shown in FIG. 6, the clipboard 100 may include one or more cutouts or windows 210 that extend through the entire thickness T of the clipboard 100 and are adapted to receive and retain a model 108. In such an embodiment a front surface of the model 108 may display the three dimensional model while the rear surface of the cartridge may be flat and adapted to sit flush with the front surface 110 of the clipboard 100 to provide a flat writing surface. In such embodiments, the rear surface of the cartridge may be transparent to allow viewing of the backside of the three dimensional model from the front side of the clipboard 100.

Front surface 110 and clip 102 may be suitably imprinted with information and/or design that enhances the information presented on the reverse side. Furthermore, clip 102 may be shaped to present further information, such as the shape of a pill or anatomical part.

This document describes the inventive three dimensional display clipboard for illustration purposes only. Neither the specific embodiments of the invention as a whole, nor those of its features limit the general principles underlying the invention. In particular, the invention is not limited to any specific configuration of clips, board shapes, board thicknesses or dimensions, display information, and/or relief display style. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention.

I claim:

1. A clipboard comprising:

a board having first and second surfaces;

a clip integral with the first surface; and a plurality of exposed recesses formed in the second surface, said recesses adapted to receive one or more models;

wherein the first surface is a writing surface and the second surface is a rear surface of the board opposed to the writing surface, said recesses being exposed rearwardly of the clipboard.

2. The clipboard of claim 1 further comprising a clip for securing the model in the recess.

3. The clipboard of claim 2, wherein the clip is formed internal to the recess.

4. The clipboard of claim 1 further comprising a retaining ridge for securing the model in the recess.

5. The clipboard of claim 1, wherein the models are recessed and do not protrude from the second surface.

6. The clipboard of claim 1, wherein the models protrude from the second surface.

7. The clipboard of claim 1, wherein the models are formed internal to the clipboard and do not protrude from the second surface when in a stored position and flip out to protrude from the second surface when in a display position.

8. The clipboard of claim 1 further comprising an integrated dry-erase marker for marking the one or more models.

9. The clipboard of claim 1 further comprising a transparent film overlaying the model, wherein the film can be written on without marking up the model.

10. The clipboard of claim 1 further comprising a window formed in the recess, wherein the window extends to the first surface of the clipboard.

11. The clipboard of claim 10, wherein a model placed in the recess extends through the window to produce a flat surface on the first surface.

12. The clipboard of claim 10, wherein the model is at least semi-transparent enabling viewing of the model from the first surface.

13. The clipboard of claim 1 further comprising one or more element selected from the group consisting of lights, motors, sliding members, rotating members, removable members, and sound generators.

14. The clipboard of claim 1 wherein the models are molded into the second surface of the clipboard.

15. The clipboard of claim 1, wherein the models are removable.

16. The clipboard of claim 1 further comprising a tool for removal and insertion of the models.

17. A writing and display system comprising:

a board having first and second surfaces, the first and second surface being on opposed sides of the board the first surface being on the front side, the second surface being on the rear side, and exposed to the rear side;

a clip formed on the first side of said board;

a model received in said second surface and exposed to the rear side; and a pen including a dry erase marker usable for marking the model received in the second surface and for writing on the first surface.

18. The system of claim 17, wherein the first surface is a writing surface.

19. The system of claim 17, further comprising a recess in said rear surface, said model positioned in said recess.

* * * * *